(12) United States Patent
Hussain et al.

(10) Patent No.: US 11,134,060 B2
(45) Date of Patent: Sep. 28, 2021

(54) MOBILE VIRTUAL PRIVATE NETWORK CONFIGURATION

(71) Applicant: Hewlett Packard Enterprise Development LP, Houston, TX (US)

(72) Inventors: Syed Rafiul Hussain, Palo Alto, CA (US); Kyu-Han Kim, Palo Alto, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 278 days.

(21) Appl. No.: 16/070,948

(22) PCT Filed: Jan. 29, 2016

(86) PCT No.: PCT/US2016/015762
§ 371 (c)(1),
(2) Date: Jul. 18, 2018

(87) PCT Pub. No.: WO2017/131767
PCT Pub. Date: Aug. 3, 2017

(65) Prior Publication Data
US 2019/0058694 A1 Feb. 21, 2019

(51) Int. Cl.
*H04L 29/06* (2006.01)
*H04L 29/08* (2006.01)
*H04L 12/46* (2006.01)
*H04L 12/24* (2006.01)

(52) U.S. Cl.
CPC ...... *H04L 63/0272* (2013.01); *H04L 12/4633* (2013.01); *H04L 12/4641* (2013.01); *H04L 41/0806* (2013.01); *H04L 63/0428* (2013.01); *H04L 67/2819* (2013.01); *H04L 69/04* (2013.01); *H04L 69/22* (2013.01)

(58) Field of Classification Search
CPC .......... H04L 63/0272; H04L 12/4641; H04L 12/4633
See application file for complete search history.

(56) References Cited

U.S. PATENT DOCUMENTS

| 6,226,748 B1 * | 5/2001 | Bots .................. H04L 12/46 726/15 |
| 6,594,704 B1 * | 7/2003 | Birenback ......... H04L 12/4641 709/238 |
| 6,954,790 B2 | 10/2005 | Forslow |
| 7,486,951 B2 | 2/2009 | Chen et al. |
| 7,808,970 B2 | 10/2010 | Narayanan et al. |

(Continued)

OTHER PUBLICATIONS

"Columbitech Mobile VPN," Technical Description, Jan. 25, 2013, pp. 1-28, Columbitech AB.

(Continued)

*Primary Examiner* — Dao Q Ho
(74) *Attorney, Agent, or Firm* — Brooks, Cameron & Huebsch, PLLC

(57) ABSTRACT

Example implementations relate to mobile virtual private network (mVPN) configuration. For example, a system for mVPN configuration may include a configuration selector to intercept an internet protocol (IP) packet in a mobile virtual private network (mVPN) and select a mVPN configuration for the IP packet using a lookup table. The system may further include a configuration adapter to adapt the IP packet according to the selected mVPN configuration.

16 Claims, 4 Drawing Sheets

(56) References Cited

U.S. PATENT DOCUMENTS

| | | |
|---|---|---|
| 8,276,035 B1 | 9/2012 | Savarese et al. |
| 2004/0001467 A1 | 1/2004 | Cromer et al. |
| 2007/0053445 A1 | 3/2007 | Van Der Schaar et al. |
| 2009/0016253 A1 | 1/2009 | Lewis et al. |
| 2010/0002628 A1* | 1/2010 | Anchi ................ H04L 12/6418 370/328 |
| 2013/0191906 A1* | 7/2013 | Park ...................... H04W 12/06 726/15 |
| 2014/0241247 A1* | 8/2014 | Kempf ................ H04L 12/4641 370/328 |

OTHER PUBLICATIONS

International Searching Authority, The International Search Report and the Written Opinion, dated Sep. 12, 2016, PCT/US2016/015762, 12 Pgs.

* cited by examiner

MOBILE VIRTUAL PRIVATE NETWORK CONFIGURATION

BACKGROUND

Virtual Private Network (VPN) technology allows a remote device on an unsecure or a public network to connect to a private network over a highly-secure encrypted tunnel. Mobile VPN (mVPN) solutions have emerged to allow remote mobile devices such as mobile phones, laptop computers, and/or tablet computers among other devices, to connect to the VPN.

DETAILED DESCRIPTION

The Virtual Private Network (VPN) technology allows a remote device on an unsecure or a public network to connect to a private network over a highly-secure encrypted tunnel. Existing VPN solutions were not designed for mobile hosts and therefore do not address issues related to mobility such as roaming, network change, IP address reassignment, gaps in coverage, sleeping of the device due to power management or user actions, and unreliable and slow wireless connections. Hence, mobile VPN (mVPN) solutions have emerged which are built on top of VPN, but crafted to address most of these mobility problems Wide use of mobile phones and high network connectivity may allow mobile device users to use mobile virtual private networks (mVPN) in order to access enterprise resources and also in some cases to access some restricted sites from particular countries. This mVPN may be designed to address most mobility issues, however, mVPNs may use the same configuration parameters for a single VPN to encapsulate/decapsulate packets of different classes of traffic and also require a hard-reset for a single change in configuration parameters. For example, mVPNS may use the same configuration parameters for texting, real-time voice and video conferencing, as well as media streaming. As such, mVPNs may yield about 7-10× slower network throughput in a mobile device. Hence, a configurable mVPN hard-reset solution which is able to adjust the configuration parameters dynamically based on class of traffic, location and current load of the VPN server, mobility pattern of the mobile devices, and the speed and reliability of WiFi and LTE may be desirable.

Configuration of an mVPN, in accordance with examples of the present disclosure, may avoid a soft-reset of the mVPN for even minute configuration changes. Further, in accordance with examples of the present disclosure, mVPN configuration may allow for traffic to be classified quickly and accurately, and configuration settings to be selected for particular classes of traffic in an efficient manner. Further, configuration of an mVPN, in accordance with examples of the present disclosure, includes a VPN solution that provides customized treatment to different classes of data traffic and does not include a separate VPN tunnel for an individual application of mobile devices.

Figure 1:
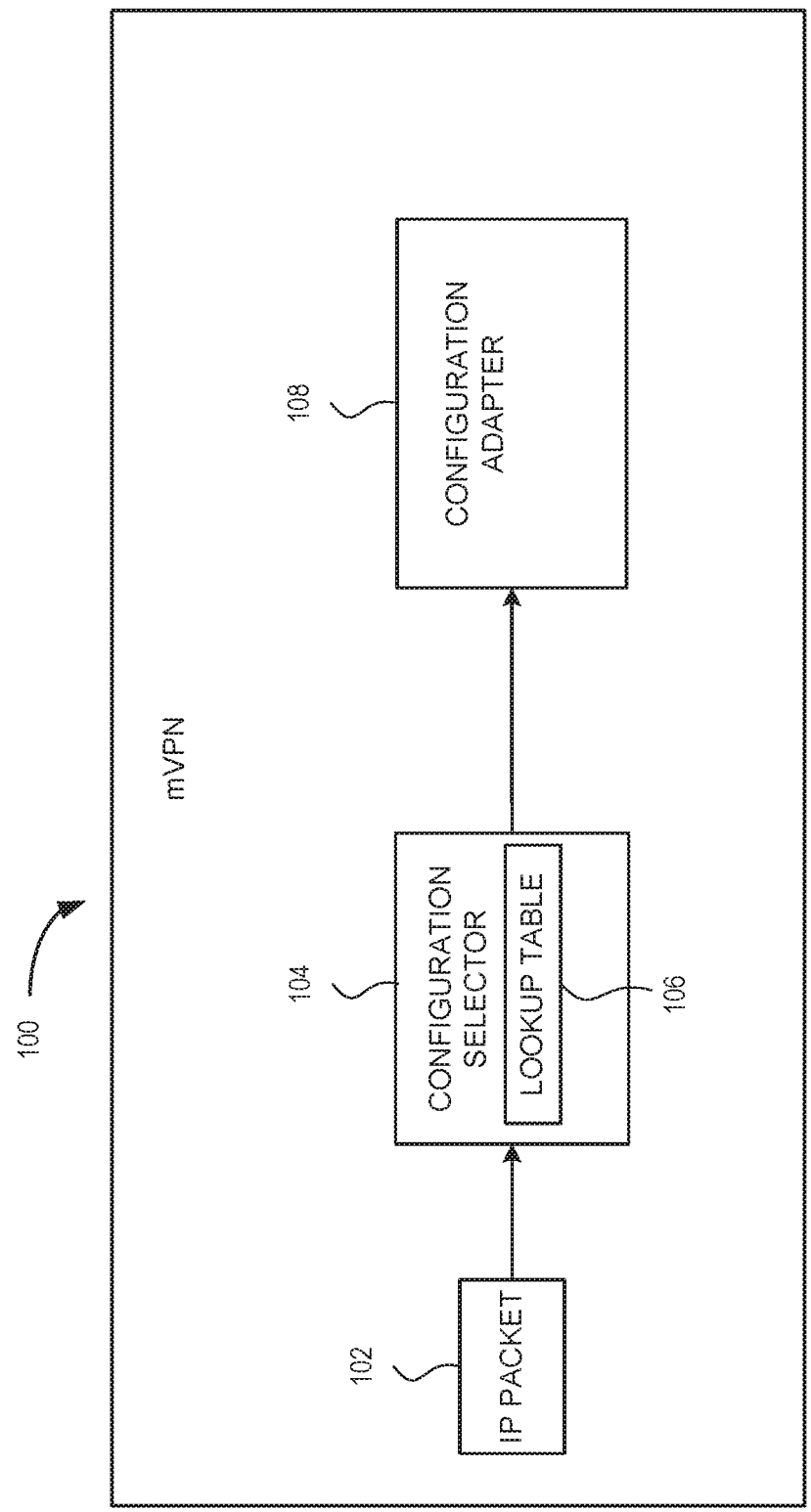
FIG. 1 is an example of a system for mVPN configuration consistent with the present disclosure.

FIG. 1 is an example of a system 100 for mobile virtual private network (mVPN) configuration consistent with the present disclosure. As illustrated in FIG. 1, the system 100 may include a configuration selector 104 to intercept an internet protocol (IP) packet 102 in a mVPN and select an mVPN configuration for the IP packet using a lookup table 106. Similarly, the system 100 may include a configuration adapter 108 to adapt the IP packet 102 according to the selected mVPN configuration.

A VPN is a means to ensure secure point-to-point communication between network nodes over an otherwise insecure network such as the Internet. It features authentication, encryption, data integrity, and non-repudiation. During the connection setup, a VPN may create a "tunnel" between the server and its client. During communication, the VPN tunnel may encrypt and encapsulate payload data (at a lower layer or application layer of the network stack based on the type of VPN) and hand the packets over to the untrusted network.

A mobile VPN (mVPN) is an extended version of a VPN that employs advanced data compression algorithms to cope with limited network bandwidth. mVPN clients (e.g., devices) may have a smaller memory foot-print and require less processing power and battery than VPN clients. Mobile VPN adds overheads to IP packets in order to enable secure communication over a VPN tunnel. Depending on the chosen values of configuration parameters such as encryption key length, use of compression, and other cipher parameters, a typical mVPN connection's application level throughput could be several orders of magnitude lower than a VPN-less communication. One approach to accelerate mVPN is to use a suitably chosen configuration based on the type of the running application. While such an "application level" adaptation of mVPN configuration increases an application's throughput to some extent, the improvement is limited. The limit comes from the fact that a typical mobile application sends and receives a wide variety of data traffic such as text, audio, video, and sensor values. Each of these categories of traffic has a different bandwidth and security requirement. By knowing the type, bandwidth, and the security requirement of the data traffic carried by the packets, if mVPN parameters are dynamically adjusted at the "packet-level", the overall throughput of the application can be increased by several orders of magnitude.

As such, mVPN configuration according to the present disclosure includes selection of a configuration, and adaptation of the selected configuration. The configuration adapter 108 may operate in two phases of a mobile VPN connection: the initialization of the mVPN configuration which occurs during the connection establishment; and the adaptation of configuration during the communication between a server and its client. Put another way, the configuration adapter 108 may compute values for encryption algorithms with different key lengths at the time of a device connecting with the mVPN. During the lifetime of the mVPN communication, configurations are likely to be changed from time to time. In order to make the adaptation process efficient, the configuration adapter 108 may precompute values of some parameters, such as encryption algorithms with different key lengths, at the time of a connection establishment. Because these parameters change frequently and have a higher computational overhead, precomputing and storing them at the time of a connection establishment makes the configuration adapter 108 (and therefore system 100) much more efficient than computing these values again and again during the course of its lifetime.

Once a connection is established, the configuration adapter 108 may enter into the configuration adaptation phase. In this phase, the configuration adaptor 108 may wait for a decision from the configuration selector 104 to initiate an adaptation process. Once initiated, the configuration adapter 108 may apply the new configuration by controlling the compression and encryption processes, sets a specific flag in a header of the packet, and prepends a configuration identification (ID) to the header so that the other end of the tunnel knows what configuration is in effect. Put another way, the configuration adapter 108 sets a specific flag in a header of the IP packet 102, and prepends a configuration ID to a header of each IP packet 102 to identify the selected mVPN configuration for the associated IP packet 102.

Figure 2:
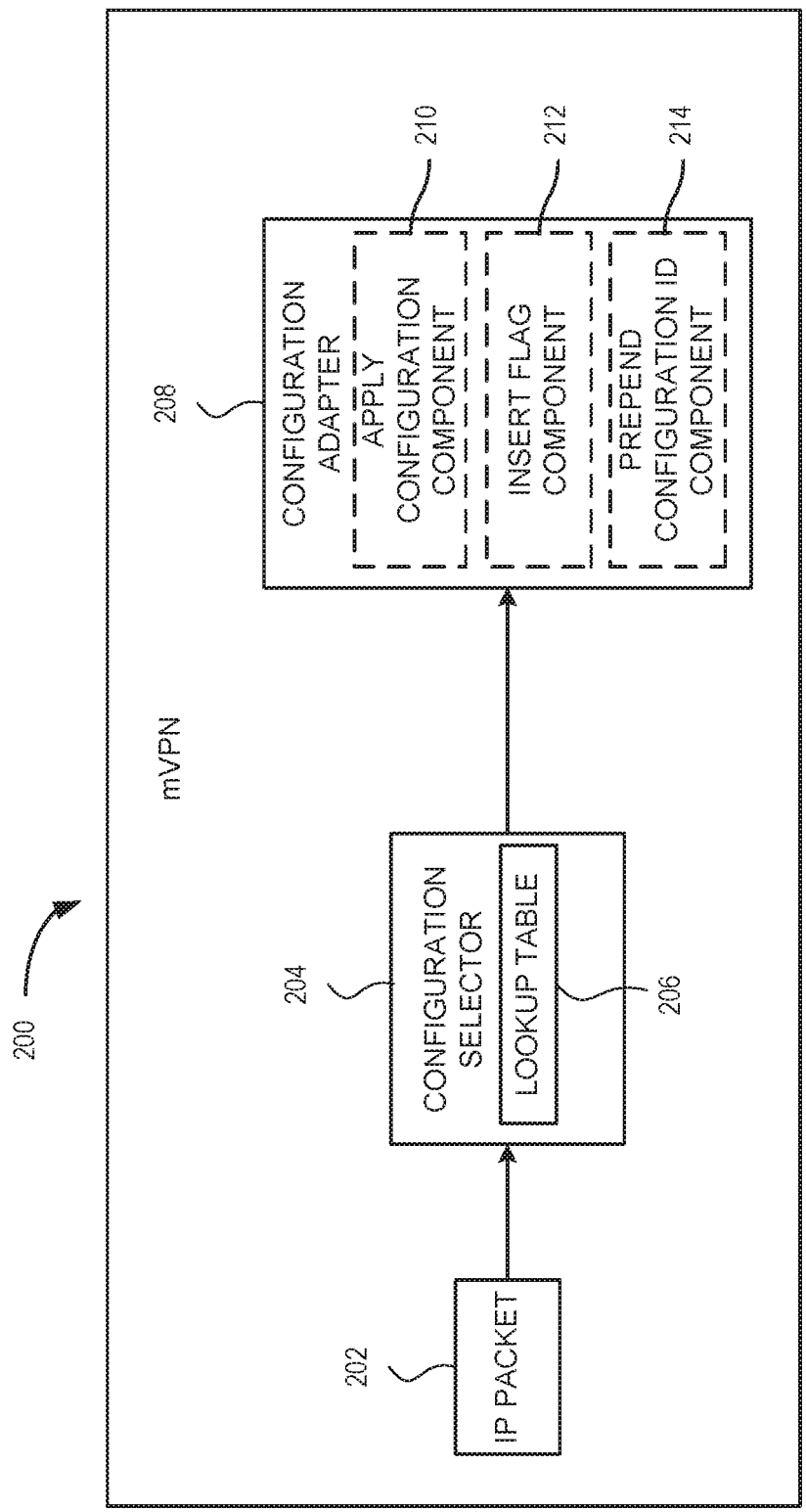
FIG. 2 is an example of a system for mVPN configuration consistent with the present disclosure.

FIG. 2 is an example of a system 200 for mVPN configuration consistent with the present disclosure. As illustrated in FIG. 2, the configuration adapter 208 may include an apply configuration component 210 to control compression of the IP packet 202 and control encryption of the IP packet 202. Similarly, the configuration adapter 208 may include an insert flag component 212 to change a bit of the header of the IP packet 102 to indicate that the mVPN configuration has changed. Furthermore, the configuration adapter 208 may include a prepend configuration ID component 214 to add an extra byte containing the selected mVPN configuration to the header of the IP packet 202.

The apply configuration component 210 may perform a plurality of tasks. First, the apply configuration component 210 may control the compression or decompression, and encryption or decryption of packets. If the selected configuration has 'compression' as one of its parameters, the configuration adapter 208 may enable compression or decompression. Similarly, if a new encryption algorithm or key is mentioned in the configuration, the configuration adapter 208 may locate the precomputed key, uses the key to encrypt or decrypt the payload, and then signs or authenticates the packet.

The insert flag component 212 may interact with the packet header creation process. The packet header may include a plurality of bits, such as 8. The packet header may include an opcode, perhaps comprising 5 bits, and a key ID, perhaps comprising 3 bits. This header may be used by a receiving device to identify CONTROL/DATA/ACK packets, and the key may be used to process the received packet. Of the 5 opcode bits, one bit may be used to convey a message to the receiving device that the configuration of the packet has been changed.

The prepend configuration ID component 214 may pass the new configuration ID to its peer at the receiving end. The prepend configuration ID component 214 may add an extra byte containing the configuration ID to the packet header. This extra byte may be added by the sender once per configuration adaptation, and the byte may be consumed by the receiver only when the header flag is set.

The configuration selector 204, may also include a plurality of components, may run at the server end, and decide whether or not switching to a new mVPN configuration will improve a device's throughput. The configuration selector 204 may include a lookup table 206, as described herein, The lookup table 206 may store a mapping between a set of mVPN configurations and the corresponding expected client device throughputs, given the type of the data traffic and the network context. As such, a type of data traffic may be determined by a traffic classifier, and a network context monitoring service may provide information on the client device's throughput, as discussed further in relation to FIG. 3.

Figure 3:
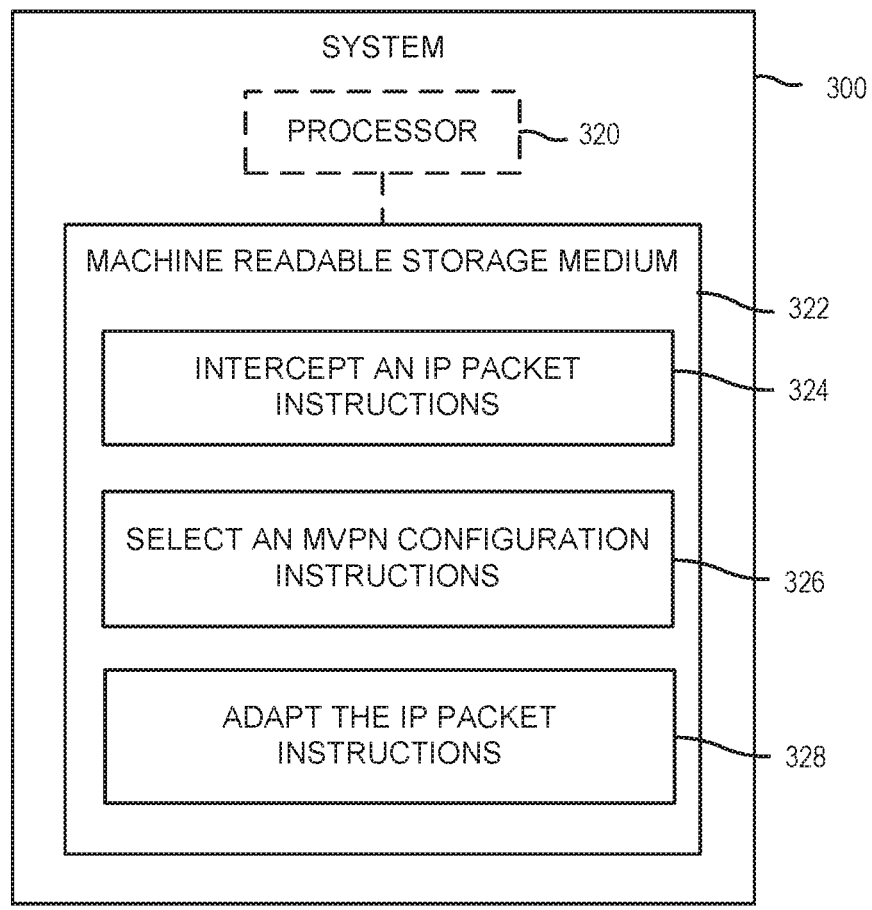
FIG. 3 is a block diagram of an example mVPN configuration system, consistent with the present disclosure.

FIG. 3 is a block diagram of an example mVPN configuration system 300, consistent with the present disclosure. System 200 may include a computing device that is capable of communicating with a remote system. In the example of FIG. 3, system 300 includes a processor 320 and a machine-readable storage medium 322. Although the following descriptions refer to a single processor and a single machine-readable storage medium, the descriptions may also apply to a system with multiple processors and multiple machine-readable storage mediums. In such examples, the instructions may be distributed across multiple machine-readable storage mediums and the instructions may be distributed across multiple processors. Put another way, the instructions may be stored across multiple machine-readable storage mediums and executed across multiple processors, such as in a distributed computing environment.

Processor 320 may be a central processing unit (CPU), microprocessor, and/or other hardware device suitable for retrieval and execution of instructions stored in machine-readable storage medium 322. In the particular example shown in FIG. 3, processor 320 may receive, determine, and send instructions 324, 326, 328 for mVPN configuration. As an alternative or in addition to retrieving and executing instructions, processor 320 may include an electronic circuit comprising a number of electronic components for performing the operations of the instructions in machine-readable storage medium 322. With respect to the executable instruction representations or boxes described and shown herein, it should be understood that part or all of the executable instructions and/or electronic circuits included within one box may be included in a different box shown in the figures or in a different box not shown.

Machine-readable storage medium 322 may be any electronic, magnetic, optical, or other physical storage device that stores executable instructions. Thus, machine-readable storage medium 322 may be, for example, Random Access Memory (RAM), an Electrically-Erasable Programmable Read-Only Memory (EEPROM), a storage drive, an optical disc, and the like. Machine-readable storage medium 322 may be disposed within system 300, as shown in FIG. 3. In this situation, the executable instructions may be "installed" on the system 300. Machine-readable storage medium 300 may be a portable, external or remote storage medium, for example, that allows system 300 to download the instructions from the portable/external/remote storage medium. In this situation, the executable instructions may be part of an "installation package". As described herein, machine-readable storage medium 322 may be encoded with executable instructions for monitoring network utilization.

Referring to FIG. 3, intercept an IP packet instructions 324, when executed by a processor such as processor 320, may cause system 300 to intercept an internet protocol (IP) packet in a mobile virtual private network (mVPN) network using a configuration selector. Select an mVPN configuration instructions 326, when executed by a processor such as processor 320, may cause system 300 to select, using the configuration selector, a mobile VPN (mVPN) configuration for the IP packet based on a data traffic type for the packet and a context of the IP packet. As such, the system 300 may include instructions that when executed by a processor such as processor 320, may cause system 300 to classify the IP packet into one of a plurality of data traffic types based on a bandwidth usage for the packet. For example, classifying the IP packet may include classifying the IP packet as one of an I-frame, a P-frame, or a B-frame in response to a determination that the IP packet includes video data.

The system 300 a decision tree based classier to classify each IP packet into one of the following categories based on their bandwidth: low bandwidth sensor and text data; medium bandwidth files and small images; and high bandwidth multimedia such as video with audio, larger files, and images. Frames in video streams may further categorized into three classes: I-, P-, and B-frames since they have different bandwidth and security requirements. As used herein, an I-frame refers to a frame type in a video stream that is the least compressible among the types of video frames, but doesn't require other video frames to decode. In contrast, a P-frame refers to a frame type in a video stream that can use data from previous frames to decompress, and which is more compressible than I-frames. Further, B-frames refer to a frame type in a video stream that can use both previous and forward frames for data reference to get the highest amount of data compression. As such, I-frames may be considered more important than P- and B-frames, and may require higher security and less compression configuration for mVPN as compared to P- and B-frames.

In some examples, the system 300 may include instructions that when executed by a processor such as processor 320, may cause system 300 to determine the context of the IP packet by categorizing the IP packet into one of a plurality of data traffic types based on a signal strength received from a client device associated with the IP packet. In some examples, the IP packet may be categorized into a data traffic type based on one of a location of the client device, a time of day of transmission of the IP packet within the network, a cellular tower identification, an access point media access control (MAC) address, and network route information. As described in relation to FIG. 1, a network context monitoring service may provide information on a client device's throughput. The network context monitor may keep track of three types of information about the mobile client's connection: last hop wireless network type, throughput estimates, and signal strength level. The type of network, such as cellular or WiFi, may be determined by the server when the connection is established. This may be found by looking up the IP address of the peer in a list of IP addresses belonging to a particular cellular network operator.

In some examples, the system 300 may include instructions that when executed by a processor such as processor 320, may cause system 300 to determine the context of the IP packet by categorizing the IP packet into one of a plurality of data traffic types based on a signal strength subdivided into a number of different categories. For example, a client device in the system 300 (and system 100 illustrated in FIG. 1) may report its WiFi and/or LTE's signal strength periodically, such as once per minute, and/or only if there is a significant change in it (e.g., there is a change is signal strength greater than a threshold level of signal strength change). The system 300 may include instructions that when executed by a processor, cause the system 300 to classify the signal strength into one of three categories, such as A, B, or C, by dividing the full range of signal strengths into 3 subranges.

In some examples, the system 300 may include instructions that when executed by a processor such as processor 320, may cause system 300 to determine the context of the IP packet by incorporating additional information such as a client's location, time of day, cell tower ID or access point's MAC address, and route information such as hop count and network congestion.

With the help of the lookup table (e.g., lookup table 106 illustrated in FIG. 1), the configuration selector (e.g., configuration selector 104 illustrated in FIG. 1) may determine if there exists another valid configuration which yields a better throughput than what the client device is experiencing, given the data traffic type and the network context of the moment. This search for a valid configuration may also involve checking constraints on configurations such as when a client requires a certain parameter to remain unmodified, and updating the lookup table with new information such as refining the mapping between a configuration and its corresponding throughput). As such, select an mVPN configuration instructions 326, when executed by a processor such as processor 320, may cause system 300 to select, using the configuration selector, a mobile VPN (mVPN) configuration for the IP packet based on a data traffic type for the packet and a context of the IP packet.

Adapt the IP packet instructions 328, when executed by a processor such as processor 320, may cause system 300 to adapt during runtime of the network and using a configuration adapter, the IP packet according to the selected mVPN configuration. For example, as discussed in relation to FIG. 1, the packet may be modified with predetermined key values based on the associated mVPN configuration selected.

In some examples, the system 300 may include instructions that when executed by a processor such as processor 320, may cause system 300 to group each of the plurality of configurations into a configuration cluster including a plurality of mVPN configurations, and select a configuration cluster among the plurality of configuration clusters for the IP packet.

Figure 4:
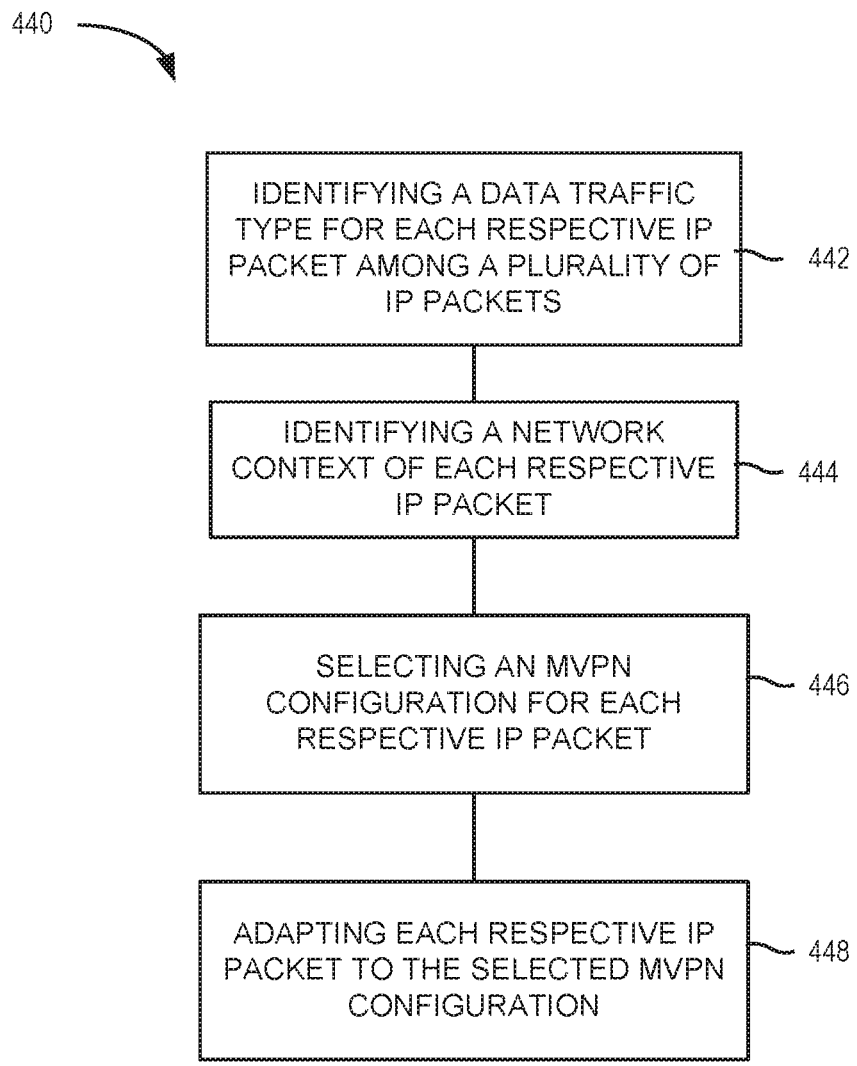
FIG. 4 illustrates an example method for mVPN configuration consistent with the present disclosure.

FIG. 4 illustrates an example method 440 for mVPN configuration consistent with the present disclosure. At 442, the method 440 may include identifying a data traffic type for each respective IP packet among a plurality of IP packets using a traffic classifier. For example, a data stream may include a plurality of data packets. For each packet in the data stream, a data traffic type may be determined, as discussed in relation to FIGS. 1, 2, and 3. Further, at 444, the method 440 may include identifying a context of each respective IP packet among the plurality of IP packets. Also, as discussed in relation to FIGS. 1, 2, and 3, a context may be determined for each of the packets among the plurality of packets.

At 446, the method 440 may include selecting an mVPN configuration for each respective IP packet among the plurality of IP packets based on the identified traffic type and the identified network context. At 448, the method 440 may include adapting each respective IP packet among the plurality of IP packets to the selected mVPN configuration. In some examples, adapting each respective IP packet among the plurality of IP packets to the selected mVPN configuration includes modifying a packet header of the associated IP packet, as discussed in relation to FIGS. 1, 2, and 3.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, "a number of" an element and/or feature can refer to one or more of such elements and/or features.

What is claimed:

1. A system comprising:
a processor; and
a non-transitory machine-readable medium storing instructions executable by a processor to:
intercept a plurality of internet protocol (IP) packets of differing data types associated with a single application in a mobile virtual private network (mVPN);
determine a traffic classification corresponding to each differing data type;
select a mVPN configuration for compression and encryption of each of the plurality of IP packets based on transceiving requirements corresponding to the differing data types using a lookup table that stores a mapping between a set of mVPN configurations and expected client device throughputs associated with the differing data types; and
adapt each of the plurality of IP packets according to the selected mVPN configuration.

2. The system of claim 1, wherein the processor computes values for encryption algorithms with different key lengths at the time of a device connecting with the mVPN.

3. The system of claim 1, wherein the processor sets a specific flag in a header of each of the plurality of IP packets.

4. The system of claim 1, wherein the processor prepends a configuration ID to a header of each IP packet to identify the selected mVPN configuration for the associated IP packet.

5. The system of claim 1, wherein the processor includes an insert flag component to change a bit of the header of each of the plurality of IP packets to indicate that the mVPN configuration has changed.

6. The system of claim 1, wherein the processor includes a prepend configuration ID component to add an extra byte containing the selected mVPN configuration to the header of each of the plurality of IP packets.

7. A non-transitory machine-readable medium storing instructions executable by a processor to:
intercept each of a plurality of internet protocol (IP) packets associated with a single application in a mobile virtual private network (mVPN) network;
select a mVPN configuration for each of the plurality of IP packets based on a data traffic type for the packet and a context of each of the plurality of IP packets, the selected mVPN configuration controlling compression and encryption of the packet based on characteristics corresponding to the data traffic type for the packet if client device throughput regarding the single application will improve; and
adapt during runtime of the network, each of the plurality of IP packets according to the selected mVPN configuration.

8. The non-transitory medium of claim 7, further including instructions executable by the processor to classify each of the plurality of IP packets into one of a plurality of data traffic types based on a bandwidth usage for the packet.

9. The non-transitory medium of claim 8, wherein the instructions to classify the IP packet further include instructions to classify each of the plurality of IP packets as one of an I-frame, a P-frame, or a B-frame in response to a determination that the IP packet includes video data.

10. The non-transitory medium of claim 7, further including instructions to determine the context of each of the plurality of IP packets by categorizing each of the plurality of IP packets into one of a plurality of data traffic types based on a signal strength received from a client device associated with each of the plurality of IP packets.

11. The non-transitory medium of claim 10, further comprising categorizing each of the plurality of IP packets into a data traffic type based on one of:
a location of the client device;
a time of day of transmission of each of the plurality of IP packets within the network;
a cellular tower identification;
an access point media access control (MAC) address; and
network route information.

12. The non-transitory medium of claim 7, further including instructions executable by the processor to:
group each of the plurality of configurations into a configuration cluster including a plurality of mVPN configurations; and
select a configuration cluster among the plurality of configuration clusters for each of the plurality of IP packets.

13. A method comprising:
identifying a data traffic type for each respective IP packet among a plurality of IP packets associated with a single application using a traffic classifier;
identifying a context of each respective IP packet among the plurality of IP packets;
selecting a mobile virtual private network (mVPN) configuration for each respective IP packet among the plurality of IP packets based on the identified data traffic type and the identified network context; and
adapting each respective IP packet among the plurality of IP packets to the selected mVPN configuration.

14. The method of claim 13, wherein adapting each respective IP packet among the plurality of IP packets to the selected mVPN configuration includes modifying a packet header of the associated IP packet.

15. The system of claim 2, wherein the processor stores the computed values for encryption algorithms with different key lengths at the time of a device connecting with the mVPN, the processor avoiding future computation of the computed values for future execution of the encryption algorithms.

16. The system of claim 1, wherein the lookup table stores a mapping between a set of mVPN configurations and corresponding expected client device throughputs.

* * * * *